United States Patent
Giazotto

(10) Patent No.: US 9,783,173 B2
(45) Date of Patent: Oct. 10, 2017

(54) ADVANCED BRAKING SYSTEM

(75) Inventor: Alessandro Riccardo Britannico Giazotto, Bristol (GB)

(73) Assignee: Airbus UK Limited, Bristol (GB)

( * ) Notice: Subject to any disclaimer, the term of this patent is extended or adjusted under 35 U.S.C. 154(b) by 2338 days.

(21) Appl. No.: 10/592,354

(22) PCT Filed: Mar. 11, 2005

(86) PCT No.: PCT/GB2005/000953
§ 371 (c)(1),
(2), (4) Date: Sep. 11, 2006

(87) PCT Pub. No.: WO2005/087563
PCT Pub. Date: Sep. 22, 2005

(65) Prior Publication Data
US 2007/0132311 A1   Jun. 14, 2007

(30) Foreign Application Priority Data

Mar. 12, 2004 (GB) .................................. 0405614.9
Sep. 23, 2004 (GB) .................................. 0421230.4

(51) Int. Cl.
B60T 15/14   (2006.01)
B60T 8/17   (2006.01)

(52) U.S. Cl.
CPC .................................. B60T 8/1703 (2013.01)

(58) Field of Classification Search
USPC ............. 303/126, 20, 3, 15, 194; 701/70, 78
See application file for complete search history.

(56) References Cited

U.S. PATENT DOCUMENTS 3,702,714 A * 11/1972 Branson ........................ 303/126
4,007,970 A    2/1977 Romero
(Continued)

FOREIGN PATENT DOCUMENTS

| EP | 0 895 929 A2 | 2/1999 |
| FR | 2 396 675 | 2/1979 |
| WO | WO 03/104057 A1 | 12/2003 |

OTHER PUBLICATIONS

"Aircraft Braking Friction Prediction From Flight Data Recorder Data"; Rado et al.; May 2001.*
(Continued)

*Primary Examiner* — Christopher Schwartz
(74) *Attorney, Agent, or Firm* — Patterson Thuente Pedersen, P.A.

(57) ABSTRACT

An advanced braking system for an aircraft is disclosed. A controller calculates the braking required from each wheel in terms of force. A constant deceleration is achieved throughout a braking run by calculating the braking from other sources, principally aerodynamic drag, and commanding a complementary total level of braking from the wheel brakes. The performance of each wheel and brake are monitored during the braking run to determine whether their braking performance is limited by the brake discs or by the tire-ground interaction and to see whether the wheel is approaching the maximum slip ratio after which a skid occurs. The controller uses this information to distribute the total demand for braking amongst the wheels. In doing this, it also aims to keep the braking demand symmetrical across the aircraft and not to overheat the brakes. The controller further measures the braking force provided by a wheel and controls its brake pressure accordingly to achieve the force desired.

20 Claims, 7 Drawing Sheets

(56) References Cited

U.S. PATENT DOCUMENTS

| | | | |
|---|---|---|---|
| 4,122,522 A | 10/1978 | Smith | |
| 4,327,413 A | 4/1982 | Ruof | |
| 5,024,491 A | 6/1991 | Pease, Jr. et al. | |
| 6,257,681 B1 * | 7/2001 | Bartram | 303/126 |
| 6,402,259 B2 * | 6/2002 | Corio et al. | 303/20 |
| 2003/0111895 A1 | 6/2003 | Salamat et al. | |
| 2004/0026992 A1 | 2/2004 | Villaume | |

OTHER PUBLICATIONS

Admitted prior art, labeled as Figure 1 in U.S. Appl. No. 10/592,354 (prior to Mar. 12, 2004).

* cited by examiner

ADVANCED BRAKING SYSTEM

The present invention relates to the braking of an aircraft on the ground.

BACKGROUND OF THE INVENTION

A known braking system used commonly in civil aircraft is shown in FIG. 1. The braking is commanded by either the pilots' brake pedals 1 or by an autobraking control unit 2. When autobraking is in use (i.e. autobraking is selected and not being overridden by the pilots' commands), the autobraking unit provides a command signal 3 to the braking system that is constant. This provides a level of deceleration from the brakes that, while it is intended to be constant, varies significantly for many reasons. The autobraking control unit 2 provides several levels of landing braking strength (marked LO,2,3,4,HI in the Figure) and a strongest level (marked RTO) for a rejected take-off, each braking level having higher level of command signal 3.

The command signal operates a hydraulic servo valve 4, which operates the brakes, determining the brake pressure 5 applied to the brakes. A feedback circuit is used to adjust the pressure applied to a particular wheel. The wheel speed 6 (in the form of the speed of the rim) is measured by a tachometer and is subtracted from a reference speed 7. The resultant speed error 8 is processed by an anti-skid filter 9, and the resultant signal is subtracted from the command current before it is applied to the servo valve 4.

The purpose of the feedback circuit is to stop the wheels 10 from skidding (and consequently locking). If the speed error is large that is because the wheel is slipping more than is desirable and this results in the feedback signal reducing the commanded current and hence the brake pressure is reduced and the skid is eliminated. The reference speed is generated to check the level of skidding that may have occurred. There are several methods in use for calculating the reference speed. Two of them are described here.

The first method is to calculate the reference speed continuously as $(1-\lambda_{OPT}) \cdot v_{GROUND}$, where $v_{GROUND}$ is the ground speed (measured for example by the aircraft's inertial guidance systems) and $\lambda_{OPT}$ is a predetermined constant, namely the "optimum" slip ratio, i.e. the slip ratio for which the friction coefficient between tyre and ground is maximum. (The slip ratio is one minus the ratio between the speed of the tyre at its edge and the ground speed.)

In the second "adapting" method, when a wheel's angular deceleration is below a certain threshold, a skid is detected and the slip ratio is reduced (by the controller) by a step increase of reference speed, which generates a large speed error, thus immediately reducing the brake pressure. This controls the braking to occur around the actual optimum slip ratio rather than a predetermined "optimum" slip ratio value. This method suffers from the disadvantage that it uses tachometers to measure angular velocity, which are not that accurate.

The uneven deceleration provided by this known system is a problem. In particular the inventor has realised that it can cause the attitude of the aircraft to change thus exciting the modes of the structure of the aircraft. These modes include both the normal modes of flexing of the structure of the aircraft and oscillations in the attitude of the aircraft, i.e. modes of rigid rotation of the aircraft. The flexing of the aircraft structures may cause undesirable fatigue damage. Excitation of the modes also causes an uncomfortable ride for the passengers.

There are several sources of the uneven deceleration.

One source is the braking provided by the ground wheel brakes of the landing gears. The braking force provided by a ground wheel is equal to $\mu F_z$ where $\mu$ is the coefficient of friction between the wheel and the ground and $F_z$ is the vertical load on the wheel. So, variation in the vertical load on a wheel leads to variation in the braking force. This variation in braking force in turn excites the modes of the aircraft (rigid rotational modes and normal modes of flexing), to which, of course, the wheels providing the braking are attached. In turn the motion of the aircraft due to these excited modes affects the vertical load on the wheels, which can further excite the modes, and so on.

Also, the coefficient of friction can vary along a runway, and from runway to runway and from time to time, e.g. by being wet or dry. This therefore varies the braking force, again exciting the modes of the aircraft.

Another factor is that the known braking systems often oscillate between braking (stable behaviour) and skidding (unstable behaviour) and the wheels running freely: when the wheels start to skid, the brake control system then prevents the skid. As the demand for braking is of course high, skids may soon reoccur. This switching back and forth changes the attitude of the aircraft and thus is another cause of excitation of the modes of the aircraft.

Another source of unevenness of braking in the known system is that the aircraft also undergoes the braking caused by aerodynamic drag. The magnitude of this is related to the square of the speed of the aircraft and so the initial contribution to braking is great but towards the end of braking is only a minor contribution.

SUMMARY OF THE INVENTION

The present invention seeks to alleviate these problems by better control of the braking.

An advanced braking system for an aircraft is disclosed. A controller calculates the braking required from each wheel in terms of force. A constant deceleration is achieved throughout a braking run by calculating the braking from other sources, principally aerodynamic drag, and commanding a complementary total level of braking from the wheel brakes. The performance of each wheel and brake are monitored during the braking run to determine whether their braking performance is limited by the brake discs or by the tyre-ground interaction and to see whether the wheel is approaching the maximum slip ratio after which a skid occurs. The controller uses this information to distribute the total demand for braking amongst the wheels. In doing this, it also aims to keep the braking demand symmetrical across the aircraft and not to overheat the brakes. The controller further measures the braking force provided by a wheel and controls its brake pressure accordingly to achieve the force desired.

According to the present invention there is provided an advanced braking system as defined in the appended claims.

DESCRIPTION OF THE FIGURES

Examples of the invention will now be described, with reference to the accompanying Figures, of which.

DETAILED DESCRIPTION

Figure 2:
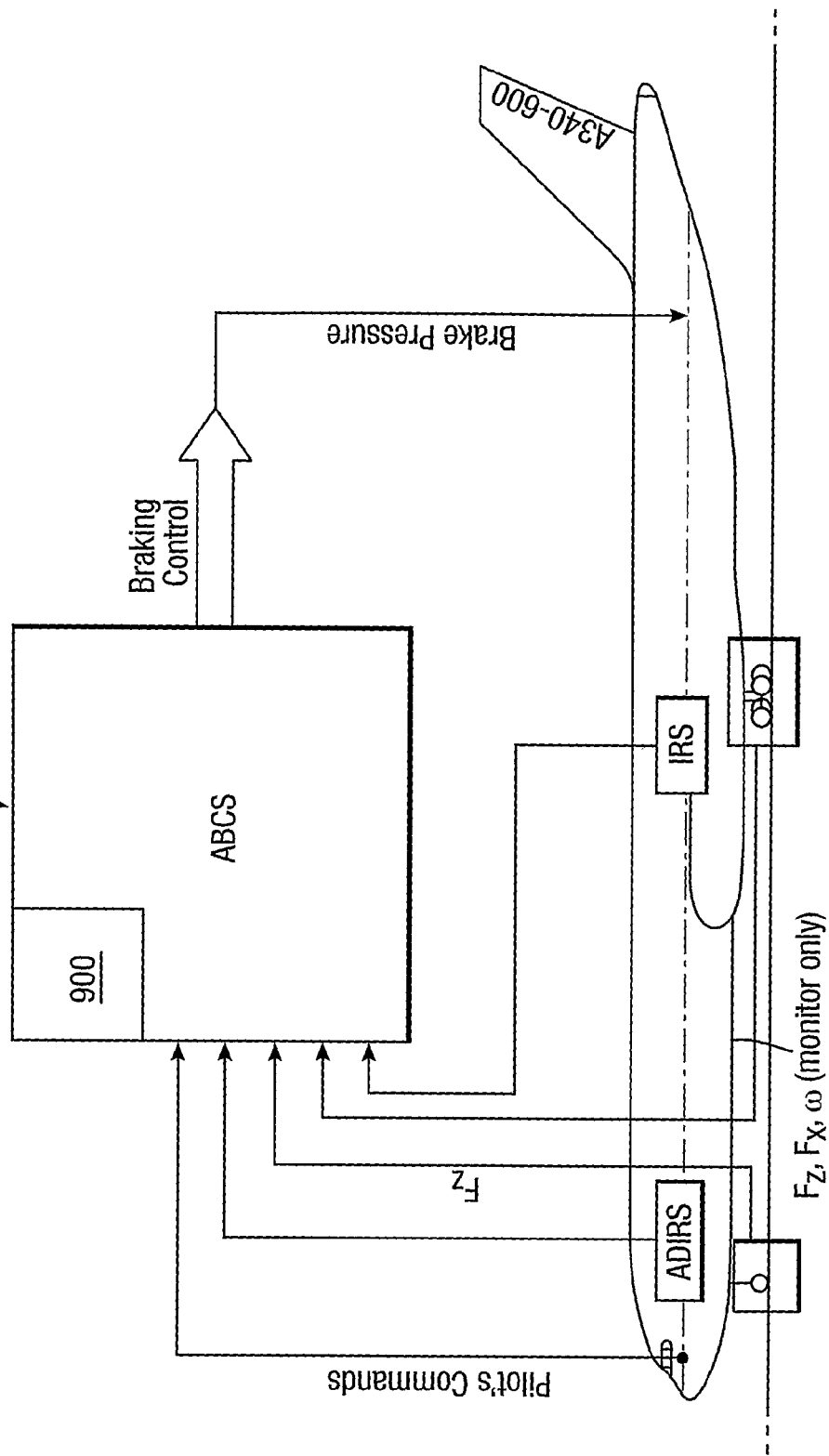
FIG. 2 is an overall block diagram of the control system of the present invention.

FIG. 2 is an overall block diagram of the control system used in the examples of the invention. The controller 20 has numerous inputs and outputs.

The inputs to the controller 20 shown are as follows:
The inertial reference system (IRS)
The air data inertial reference system (ADIRS)
These provide data concerning velocity, deceleration, pitch, roll and yaw of the aircraft.
The vertical load $F_z$ on each of the landing wheels (or alternatively on each landing gear). These are measured using strain gauges, or other stress/strain measuring devices.
The braking force $F_x$ provided by each landing wheel. (Preferably these are measured using strain gauges).
The angular velocity of each landing wheel $\omega$, which provides a measure of the speed of the extremity of the tyre. This is measured with a tachometer.

The output of the controller 20 shown are as follows:
A command for the brake pressure (preferably individual commands for each of the wheels), or, more generally, a command for the braking level.

The advanced braking system of the present invention, in the preferred embodiment does monitor the slip ratio/coefficient of friction characteristic on a per wheel basis. This characteristic or law is built up throughout the period the aircraft is braking on the ground.

Figure 3:
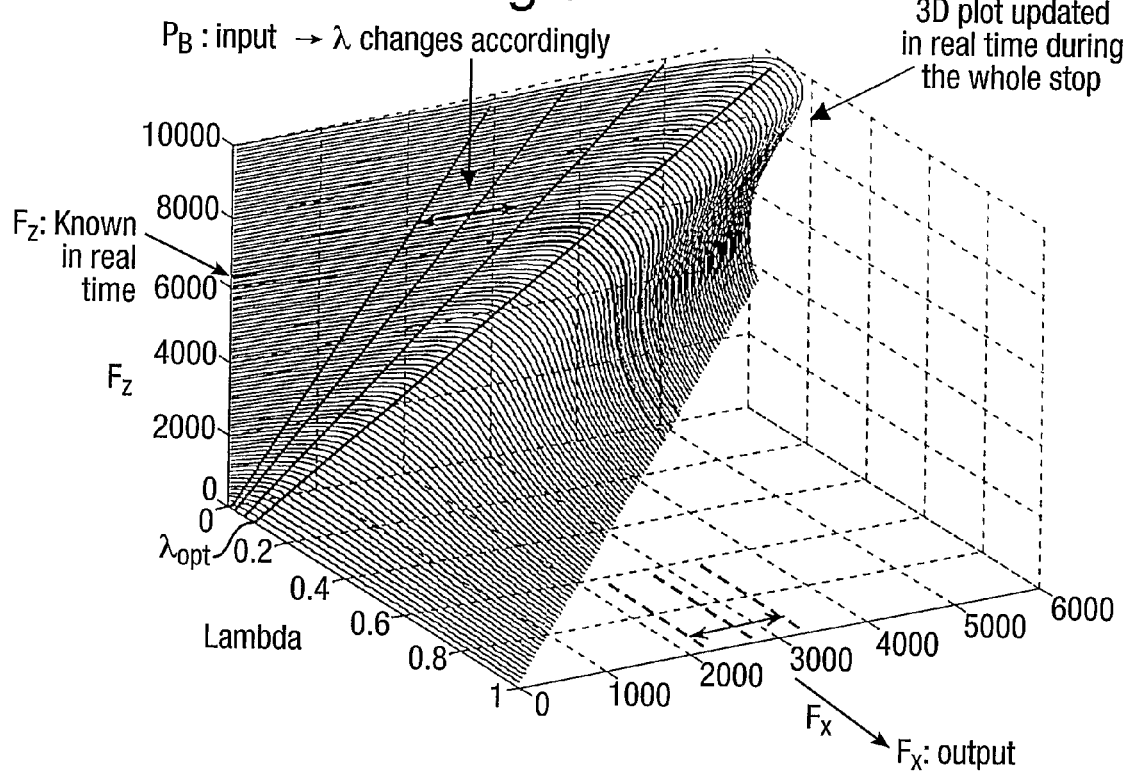
FIG. 3 is a graph of a first set of data recorded/processed by the advanced braking system.

In particular the braking controller 20 monitors the braking performance on a per wheel basis and in real time, building up and updating data for curves like those illustrated in FIG. 3 (with the aid of interpolation and extrapolation). This Figure is a 3-D plot and shows on the vertical axis the vertical load on a wheel $F_z$ and on the horizontal axes the horizontal braking force $F_x$ provided by the wheel and the slip ratio $\lambda$ for the wheel.

On the basis of the data recorded relating those three variables, the system controls the braking demand made on each wheel so as not to go too close to the unstable region in which skids occur, i.e. beyond a maximum slip desirable ratio $\lambda_{OPT}$ at which the maximum coefficient of friction $\mu_{OPT}$ occurs (the coefficient of friction between the tyre and the ground $\mu=F_x/F_z$. $\lambda_{OPT}$ for the case of FIG. 3 is marked at $\lambda=0.08$). The system is generally able to learn roughly what the optimum slip ratio is for a braking run and control the brakes accordingly.

In the Figure are marked trajectories or curves which, in the stable region of the system, are followed as the brake pressure $P_B$ is increased, which accordingly increases the slip ratio $\lambda$.

The continual updating of the plot means that the system is able to learn whether the conditions have changed (e.g. the coefficient of friction between runway and wheel has changed during a braking run) and control the braking accordingly.

The slip ratio for a wheel is preferably determined from a tachometer measuring the angular velocity $\omega$ of the wheel and the speed of the aircraft along the runway $v_x$ given by the IRS (inertial reference system) according to the equation:

$$\lambda=(v_x-\omega R)/v_x. \qquad \text{Equation 1}$$

The vertical load $F_z$ on and the braking force $F_x$ provided by a wheel are preferably measured by strain gauges on the landing gears.

The disadvantages of controlling braking on the basis of angular velocity were mentioned in the introduction, which included the imprecision of tachometers. As can be seen from equation 1 further uncertainties in the slip ratio are that the rolling radius of a wheel is never precisely known and that the velocity used is that of the aircraft rather than that of the hub of the wheel, which can differ as the landing gear moves relative to the aircraft on it supports. However, in the present invention it is the force provided by the brake that is preferably controlled and not the angular velocity of the wheel (or the slip ratio)—these last two are only monitored; the slip ratio does not control the force directly but merely sets a limit on what force would be available from the brake.

Preferably nonetheless the system also employs a traditional anti-skid filter to assure the unlocking of the wheels in any condition. While skids should not generally occur, when the present invention is employed, this is a backup safety feature.

Further the system is, in the preferred embodiment, able to understand if each wheel is working in a μ-limited region (i.e. the braking is limited by the coefficient μ of friction between the tyre and the runway) or in a torque-limited region (i.e. the braking is limited by the amount of torque that the brakes can provide) and controls the braking demand accordingly. Again controlling the force provided by the brakes avoids the problem of the prior art of controlling the angular velocity of the wheels.

Figure 4:
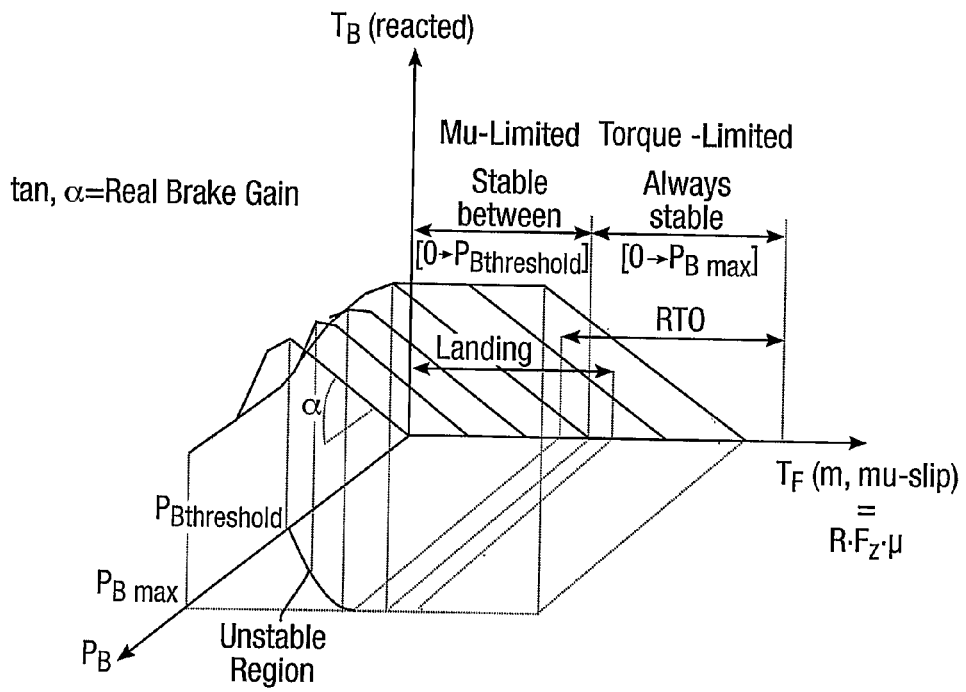
FIG. 4 is a graph of a second set of data recorded/processed by the advanced braking system.

FIG. 4 illustrates the features of these two regions. The Figure is a 3-D plot of the reacted torque $T_B$ on a wheel (i.e. the amount of torque that is produced by the brakes on the wheel) on the vertical axis against the brake pressure $P_B$ applied to the brake of that wheel (shown as a range between 0 and $P_{Bmax}$) and the frictional torque $T_F$ (i.e. that exerted on the wheel by its interaction of the ground). The torque-limited region generally occurs under higher vertical loads on the wheel (for example during a rejected take-off RTO when the aircraft is heavy). In this region there is a generally linear relation between the brake pressure $P_B$ and the reacted torque $T_B$ up to the maximum brake pressure $P_{Bmax}$, characterised by a constant slope at angle α, the tangent of which is the real brake gain. The μ-limited region generally occurs on landing when the weight of the aircraft is less. In this region, at higher brake pressures $P_B$ the reacted braking torque $T_B$ increases less slowly with brake pressure $P_B$ and reaches a maximum at a particular brake pressure $P_{threshold}$ after which the unstable region of braking is entered and a skid is likely to occur. Note that during both landing and rejected take off (RTO) it is possible for a wheel to be μ-limited or torque limited. However during RTO the aircraft is heavier and so more likely to be in the torque-limited region than during landing when the aircraft is lighter and is more likely to be in the μ-limited region, as shown by the overlapping ranges for landing and RTO's marked in FIG. 4.

Preferably the system distinguishes as to whether a wheel is in the torque-limited or the μ-limited region using a threshold value of the frictional torque $T_F$ provided by the ground wheel interaction.

The system records the data in the plot, on a per wheel basis, in real time during braking, and generates further points using extrapolation and interpolation. This allows it to know (i) the real brake gain and (ii) whether each wheel is working in a torque-limited or a μ-limited region and controls the brakes accordingly. Again since the measured data is updated throughout the braking run this is a learning system that adapts to changing conditions.

$P_B$ is measured by a pressure transducer in the brake system, $T_F$ is preferably calculated as the rolling radius R of the wheel times the vertical load on the wheel $F_Z$ times the coefficient of friction μ between the wheel and the ground. (The latter two are determined as noted above: i.e. $T_F = R.F_Z.\mu = R.F_X$).

The frictional torque is therefore that which decelerates the aircraft. It is related to the reacted torque produced by the brake according to the following relation:

$$I(d\omega/dt) = T_F - T_B - T_R.$$ Equation 2 i.e. there are adjustments for the frictional torque, compared to the reacted torque $T_B$ of the rolling resistance $T_R$ (which is approximated in the systems as a constant when the wheel angular velocity ω is greater than zero, and zero when ω equal zero) and changes in the angular velocity of the wheel. (I=the moment of inertia of the wheel and t=time.)

The system does not measure $T_B$ directly but uses this relation to calculate it.

The system uses its knowledge of $P_B$ and $T_B$ to make predictions about the braking available, using the real brake gain (i.e. tan α) and whether the system is μ-limited or torque-limited. The latter is discriminated as marked in FIG. 4 with the system being μ-limited when the frictional torque $T_F$ is below a certain value and torque-limited when it is above.

Note that the real brake gain (the relationship between the brake pressure $P_B$ and the reacted torque $T_B$) is not a constant but depends for example on temperature. The coefficient of friction of the carbon disc commonly used in brakes rises with temperature, is roughly constant at higher temperatures then drops suddenly when the temperature is reached at which the carbon sublimes forming a layer of gas.

The braking controller 20 may employ either the analysis and method described with respect to FIG. 3 or FIG. 4, but preferably both are employed. Both of these have the advantage that they use reliable predictable parameters of a braking system.

The system monitors the aircraft's deceleration, the braking commands and the braking force provided by the wheels. The system ensures that any wheel in the μ-limited region does not go into the unstable region; any further braking required is directed in preference to wheels that are torque limited.

Preferably, however, the system will also monitor the temperature of the brakes (and/or predict the temperature on the basis of the braking required) and not allow the brake pressure to be increased to a point where a brake overheats, which, generally, is more likely if the wheel is torque limited. The inventor's experiments have shown that real brake gain typically varies during a braking run being high at the beginning then dropping and rising again towards the end of the run. This is due to the variation in temperature of the brakes. By limiting the braking to limit the temperature the brake gain is kept more constant, which makes it easier to achieve constant smooth braking.

Because the real brake gain is known, the system can easily determine how much brake pressure is required to provide a desired level of braking. Because each wheel is separately monitored the brake pressure can be, and is preferably, commanded for each wheel separately. This further allows the system to ensure that the braking force for the wheels of a set of wheels of a landing gear is distributed evenly (preferably the same braking force on each wheel) to avoid torsional loads on the landing gear. Furthermore the system can distribute the desired braking force symmetrically between the landing gears. These even distributions will mean that some wheels provide less deceleration than they could otherwise, so this limitation can be overridden in an emergency. Further the system could also, unless again overridden in an emergency, keep the total braking force provided by each landing gear and/or wheel either below its operational load or at the same percentage below its operational load. This limit would generally be decided at the time of designing the brakes and landing gears.

Figure 5:
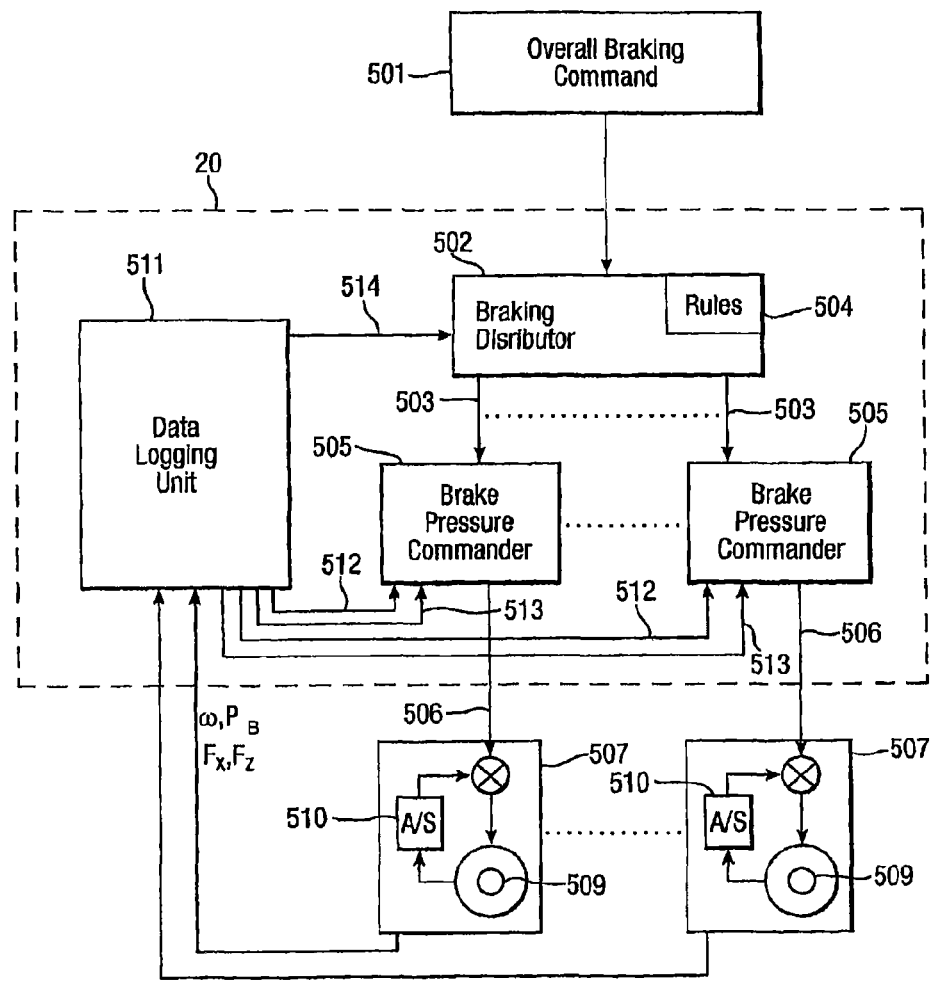
FIG. 5 is a detailed diagram of an exemplary braking controller according to the invention.

FIG. 5 is a diagram of an exemplary implementation of the braking controller 20 that performs these functions. The controller 20 receives an overall braking command 501 indicating the total braking to be provided by the wheel brakes. This command may, for example, be from the pilot or from an auto-braking system (such as the one described later below). Note that this command could be in units of force or acceleration since the two are proportional, i.e. related by the total mass of the aircraft.

A braking distributor 502 provides a separate braking command 503 for each wheel.

For these it employs rules 504 for distributing the braking demand as described above. Unless the braking available is limited, these per wheel braking commands 503 will, generally, have a total equaling the overall braking command. Where the braking is limited the distributor 502 provides the maximum braking it can. It avoids making unattainable demands, which in effect would reduce the control the distributor has. In the case of μt-limited wheels it also avoids inducing a skid.

Figure 1:
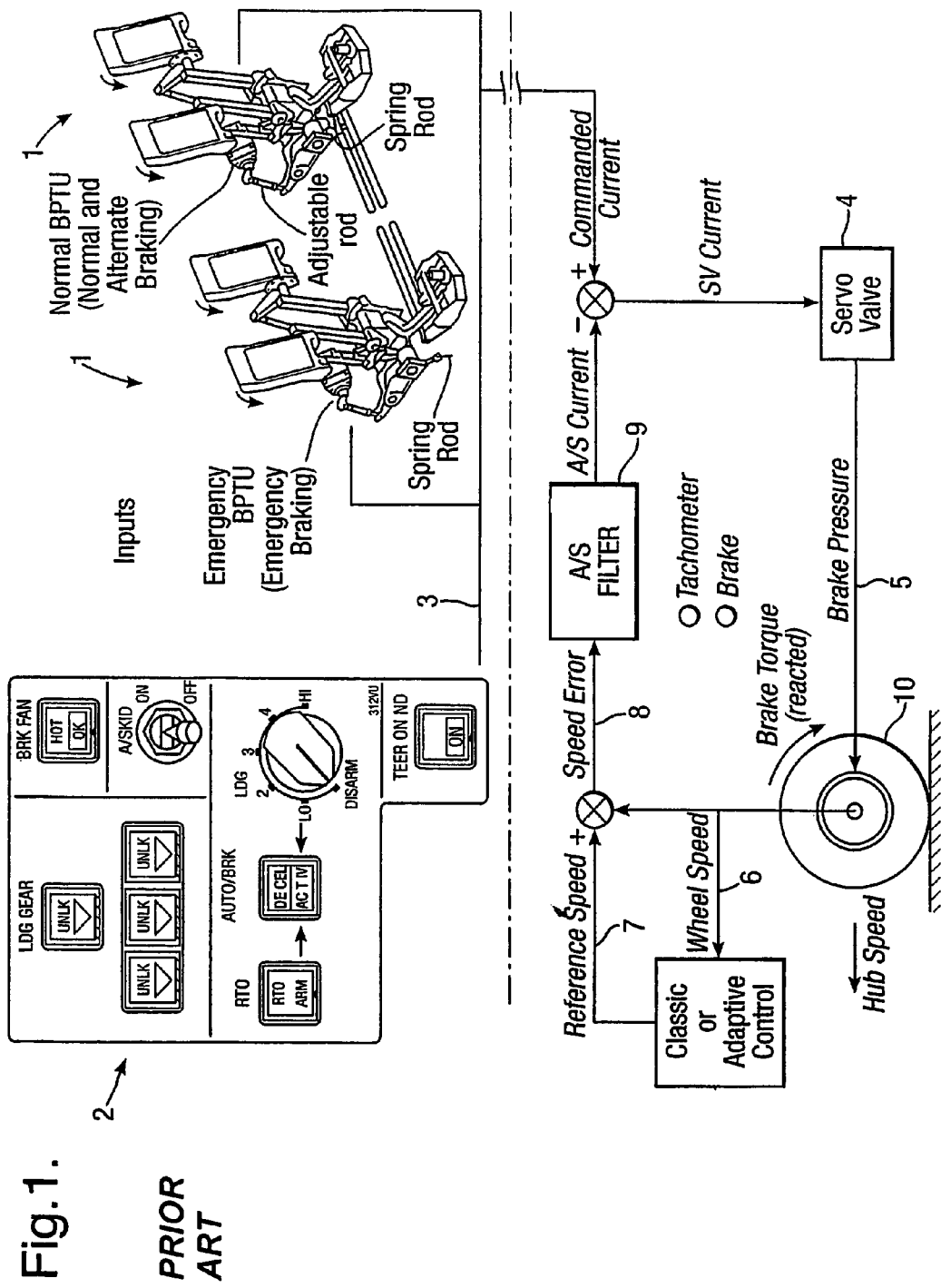
FIG. 1 shows a known brake by wire hydro-mechanical braking system for an aircraft.

The braking controller 20 further comprises for each wheel a brake pressure commander 505, which converts the braking command 503 for the wheel into a pressure command 506. This pressure command is then applied to a conventional braking system 507 (as in FIG. 1) which applies the pressure to the wheel brake 509. Preferably this includes one of the conventional forms of anti-skid filter 510.

A logging unit 511 monitors data from sensors and builds up the data for the graphs of FIGS. 3 and 4. This then provides the brake pressure commander 505 for a wheel with an indication of the braking force being provided by the wheel. This, for example, may be in terms of that force itself 513 or may be a value 512 for the real brake gain of the wheel.

Note that the braking systems herein are hydraulic and so are actuated by pressure. Many other kinds of braking are possible (though not generally used at present in aircraft) such as electromechanical. In such cases the function of the braking commander is to convert the braking level command to an actuation level command, e.g. a driving current in the case of electromechanical brakes.

The feedback provided by the brake pressure (or more generally actuation level) commander 505 is therefore in terms of braking force. This is in contrast to previous systems where the feedback is only in terms of actuation level. Feedback in force means that the command can be in terms of force (or acceleration) required, which means that the pilot is provided with a more reliable form of control—the pilot does not have to make their own judgement of and based on all the variables involved (e.g. friction coefficient of each wheel with the runway).

Figure 6A:
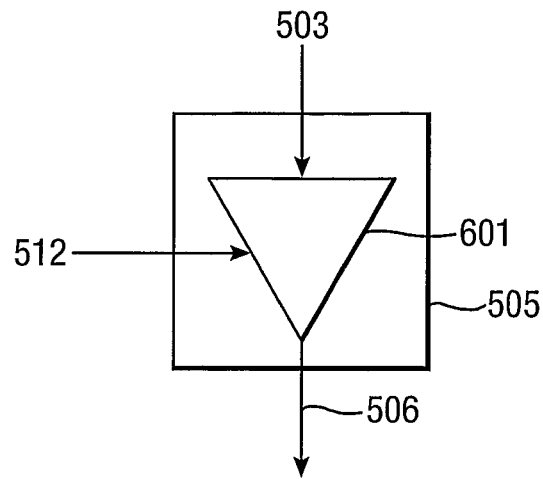
FIG. 6a is a first circuit for providing feedback in force to the braking system.
Figure 6B:
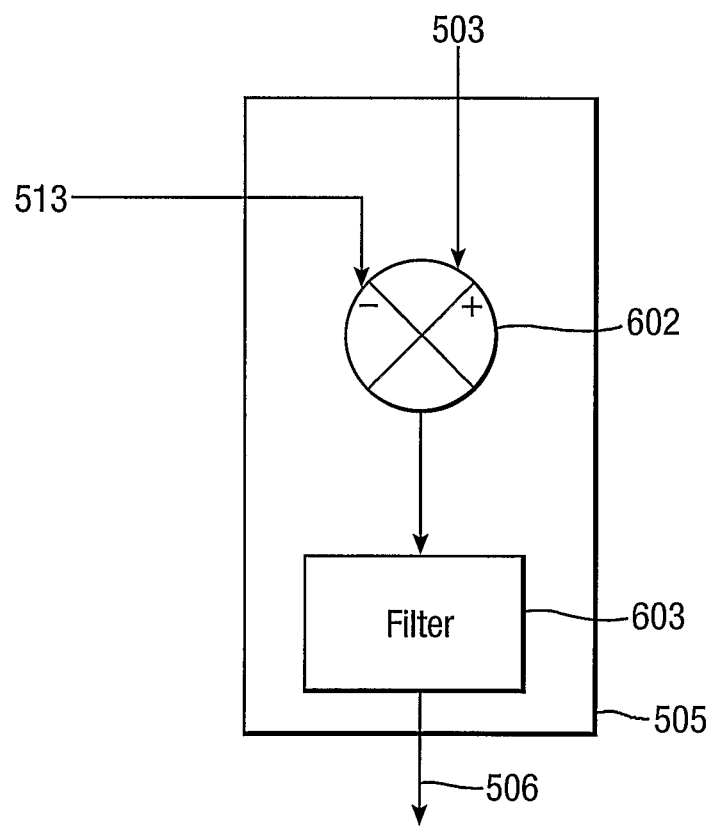
FIG. 6b is a second circuit for providing feedback in force to the braking system.

FIGS. 6a and 6b show two ways that this feedback in force can be applied.

In the brake pressure commander 505 of FIG. 6a, the braking command 503 for a wheel is scaled by a multiplier 601 by an inverse amount of the real brake gain 512 to provide the pressure command 506 for the wheel. (The brake pressure commander 505, as well as the braking distributor and logging unit are preferably implemented as a digital system, but if the brake pressure commander is provided as an analogue circuit then multiplier 601 could be provided as by a voltage controlled amplifier.)

Note that here the command 503 to the brake pressure controller is in terms of the reacted torque $T_B$ required, which is calculated by the braking distributor 502 from the braking force required from the wheel according to equation 2.

Here conveniently the braking command 503 and the value fed back are both in terms of the frictional force $F_X$ between the wheel and the ground.

In the brake pressure commander 505 of FIG. 6b, a value 513 for the braking force provided by the wheel is subtracted from the braking command 503 by subtractor 602 and the resulting difference is then fed into a filter 603. Again these may be implemented either in digital or analogue circuitry.

Referring again to FIG. 5, logging unit also provides data 514 to the braking distributor 502. For each wheel it provides an indication of whether the wheel is in a μ-limited or torque-limited region. The braking distributor then determines the braking available from each wheel. In the case of a torque-limited wheel the braking available is related to the real brake gain and the maximum brake pressure that can be applied (a constant for a particular braking system). If a wheel is μ-limited the data logger provides an estimate of the braking that can be provided by a wheel from the curves it has built up (an extrapolation of recent data if more braking is required). The distributor shares out the braking amongst the wheels without exceeding those limits. Preferably the sharing is constrained by making the total for each of any two landing gears that are symmetrically placed on the aircraft to be the same, so that a turning force is not exerted on the aircraft, which would change its course along the runway. It may also be constrained so that the net torque exerted by the wheels of a landing gear about the vertical axis of a landing gear is zero. It may also be constrained so as not to overheat the brakes or exceed a given braking force.

Figure 7:
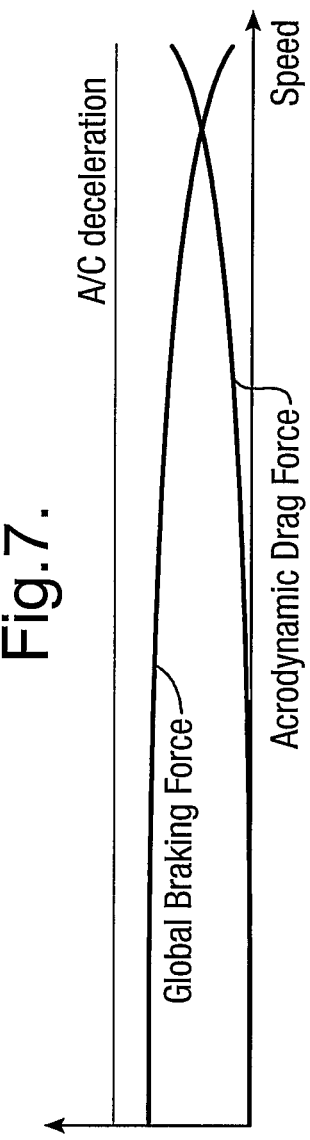
FIG. 7 is a graph of the desired form of braking control in a preferred example of a second aspect of the invention.

In a further aspect of the invention, the deceleration of the aircraft is kept constant (in order to keep the attitude of the aircraft as stable as possible). This is attained by making the braking of the wheel brakes complementary to the aerodynamic braking caused by drag. The concept is illustrated in FIG. 7. Preferably, the desired deceleration is constant (the top line in FIG. 7).

The drag force decreases as the aircraft slows down and, as this reduces, the autobraking system increases the wheel braking to compensate. Constant deceleration is desirable since it serves to reduce the excitation of the modes of the aircraft.

Although an overall deceleration that is constant is preferable, the invention could provide other overall deceleration curves (slowly varying curves would excite the normal modes less); for such curves the invention still sets the level of wheel braking, at a particular time, to make the deceleration up to that desired at that time.

Another advantage of this system is that it avoids the problem of overheating the brakes, which is more likely at high speed because energy dissipated by the aircraft depends on the kinetic energy, which of course is dependent on the square of the speed. Keeping the brakes more constant in temperature keeps the brake gain more constant making it easier to control the braking and keep it even.

An example, shown in FIG. 9 of the autobraking system of invention uses equation 3 below.

$$\frac{1}{2}mV_{Xg}^2 = \int_0^{BL} \sum_{Wheels/LG's} F_X dx + \int_0^{BL} \left( \frac{1}{2}\rho V_{Xa}^2 S C_{D\_ground} + \sum_{Wheels/LG's} \frac{T_R}{R} \right) dx$$

where:
$V_{Xg}$ is the ground speed of the aircraft along the runway
$V_{Xa}$ is the air speed of the aircraft
m is the mass of the aircraft
$F_X$ is the braking force provided by a wheel/or by a landing gear as a whole (which usually has several wheels) as is available from sensors fitted to the aircraft
ρ is the air density
S is the wing planform area
$C_{D\_ground}$ is the drag coefficient of the aircraft in ground configuration (i.e. with the flaps deployed etc.)
$T_R$ is the rolling torque of a wheel
R is the rolling radius of a wheel
x is a coordinate along the runway
BL is the braking length, the distance from the current position of the aircraft (x=0) to the end of the braking.

This equation equates the kinetic energy ($\frac{1}{2}mV_{Xg}^2$) of the aircraft during the braking of the aircraft to be dissipated along the runway to that dissipated through various processes. The first integral is the energy dissipated by the brakes. The terms of the second are that dissipated by aerodynamic drag and rolling resistance respectively.

Figure 8:
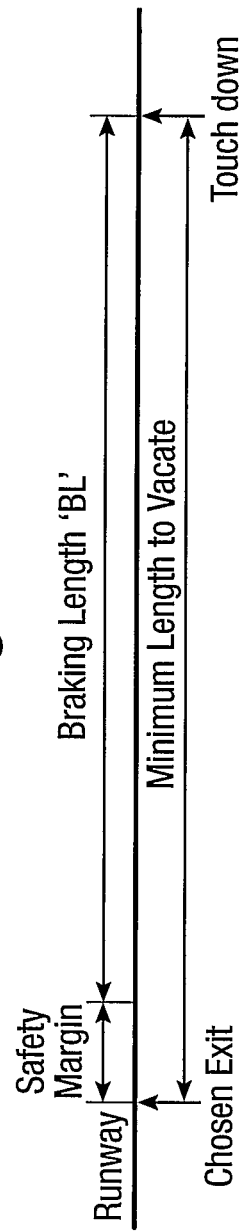
FIG. 8 is a diagram showing the braking length for an aircraft on a runway.

FIG. 8 illustrates the braking length. The initial braking length is the distance between the point of touchdown and the chosen exit from the runway less, preferably, a safety margin, in case the aircraft has not reached its desired exit speed by the end of the braking length. As the aircraft proceeds along the runway the braking length can be recalculated at the distance between the present position and the chosen exit, again preferably less the safety margin.

Figure 9:
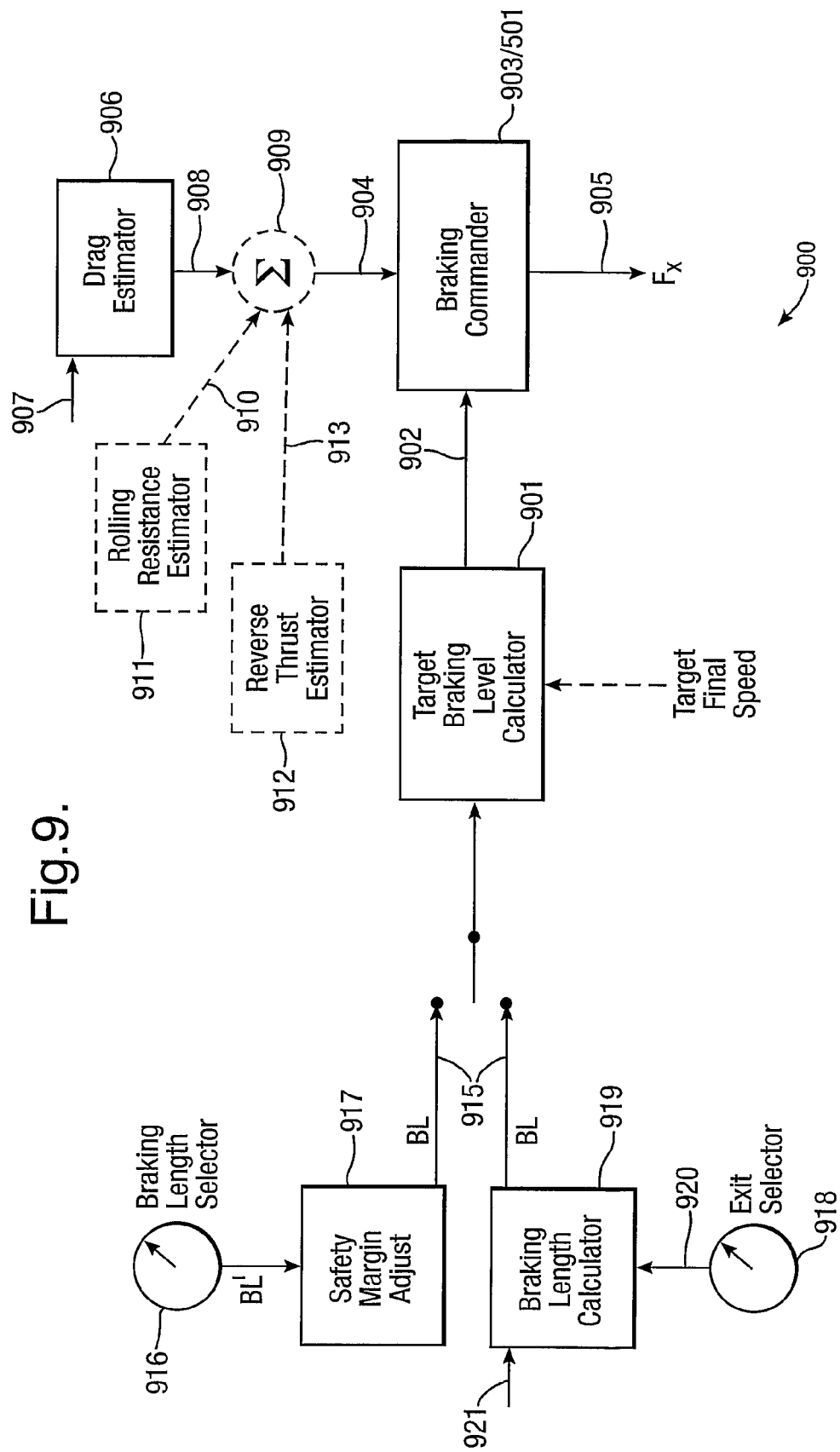
FIG. 9 is a block diagram of an exemplary braking controller according to the second aspect of the invention.

An exemplary controller 900 for carrying out the second aspect of the invention on an aircraft is shown in FIG. 9. This uses equation 3 to calculate the total braking demand ($\Sigma F_X$) required of the brakes throughout the braking run.

The controller comprises a target braking level calculator 901, which provides a target level 902 indication for the overall braking of the aircraft throughout the braking period. At its simplest (and as preferred—see FIG. 7), the target braking level calculator 901 provides a constant target level 902 throughout the braking period.

A braking commander 903 subtracts from this target level 902 an estimate 904 for braking provided by sources other than the ground wheels, providing an overall wheel braking command 905, which is used to set the brake pressure in the wheel brakes.

One other source of braking is, as mentioned above, aerodynamic drag. A drag estimator 906 estimates this from an indication 907 of the speed (preferably the air speed) of the aircraft.

To make control more accurate, further sources of deceleration can also be included. If they are included, they are added to the estimate of aerodynamic drag 908 by an adder 909. One possible other source of deceleration is from the rolling resistance of the ground wheels. An estimate 910 of this is provided by a rolling resistance estimator 911. Although this estimate could, in principle, be calculated dynamically from measurements of sensors on the ground wheels this could be impractical but a constant value is a good estimate; the value is usually small and fairly constant and therefore preferably the rolling resistance estimator 911 simply provides a predetermined constant value as its estimate 910.

A further significant source of braking is the reverse thrust from the engines. If this is taken into account, a reverse thrust estimator 912 provides an estimate 913 in response to signals from engine thrust sensors.

In this way, the wheel braking level command 905 provided by the braking commander 902 is complementary to the deceleration provided by other source or sources.

The braking commander subtracts the estimates of deceleration from other sources from the target level braking calculator but other functions are possible. For example, the braking commander could average, or lowpass filter, the estimate 904 of deceleration from other sources for subtracting it, or it could limit how fast its wheel braking level command output 905 is allowed to change.

Preferably, target braking level calculator 901 outputs a constant braking target level of aircraft deceleration throughout the period of braking. However, other functional forms are possible, for example, a linearly decreasing, or other slowly decreasing, level of overall braking would represent a compromise between constant braking (the advantages of which have been discussed above) and a shorter braking distance (because it would allow for more wheel braking immediately after touchdown).

Although the target braking level calculator could simply provide the same target level as a function of distance (or equivalently of time) on each instance of landing (or rejected take-off), preferably it takes into account a target braking length 915 (BL). An advantage of providing the braking so that it occurs exactly within a defined braking length is that it uses the minimum amount of braking necessary and avoids over braking and the consequent maintenance on the brakes.

Although this braking length could be provided by other systems, in the preferred example two alternative user controls are provided for this. A braking length selector 916 allows the braking distance required to be entered. Usually, this distance will be that between the expected point of a long touchdown (i.e. a maximum expected point beyond the target touchdown) and the desired exit from the runway. Preferably, the controller 900 also includes a safety margin adjuster 917 which subtracts from braking length selector a safety margin length and provides the resultant to the target braking level calculator 901.

An exit selector 918 provides the user with an alternative form of control. This allows an identification code for the desired exit to be keyed in. A braking length calculator 919 converts the desired exit indication 920 into its position and calculates the distance between that and a long touchdown position 921 and passes that resultant distance to the target braking level calculator as the braking length (BL). Preferably, before doing so it also subtracts a safety margin.

The long touchdown position (the furthest expected position of touchdown from the beginning of the runway) can either be keyed in or determined from signals from the ground, or from e.g. a GPS—"global positioning system" or an equivalent system; alternatively it could be stored in the controller in a pre-programmed table indexed by the identity of the airport.

Similarly the identifications and positions of the runway exists could be keyed in and be stored in a pre-programmed table in the controller. Alternatively the position of the desired exit could simply be just keyed when required. In an advanced example of the invention, information about the exits can be provided by signals from the airport's traffic control tower. The position of the exits could be supplied or alternatively a list of possible exit positions (perhaps also with respective identifications) from which the user would make a choice.

Generally, the actual touchdown position can be supplied by the aircraft's systems, so this is used in preference to the long touchdown position when available and the braking length calculator bases its calculation on this value.

Once the braking level calculator 901 has received the target braking length 915, it uses that to determine the target braking level. This it does using a method based on the equation 3 above.

On touchdown it notes the air speed and the ground speed from the inertial reference systems.

The desired functional form of the deceleration of the aircraft as a function of distance (or equivalently as a function of time) is predetermined. For example, it is to be a constant as discussed above. The system fits this functional form to the target braking length and so determines the parameters of that functional form. In the case of constant braking, the shorter the braking length the higher the target level of overall braking will have to be. ($v^2=u^2+2$ as is the formula relating the initial speed u, the final speed v to the distance s of acceleration for a constant acceleration a.) The functional form fitted could be that for the velocity but preferably the equivalent functional form for the acceleration is that which is fitted. Having determined the desired function for the acceleration, values of that function at the present distances (or times) after touchdown are output (having first been scaled by the mass of the aircraft) as the target braking level.

The target braking level calculator 901 preferably makes its calculations on the basis that the final speed of the aircraft at the end of the wheel braking will be the preferred taxi speed of the aircraft. However, a user input determining that value could be added to the controller. The value used, or set by the user, could of course be zero.

In principle at least, the controller can be provided without feedback, as described above. Without feedback, once the acceleration function is determined the target braking level calculator, the target braking level calculator simply outputs that function. It is then left to the pilot to take action if necessary by applying manual braking commands using the brake pedals.

A feedback system is, however, generally preferred. With feedback, initially the target braking level calculator proceeds in the same manner, but after a time the braking length calculator calculates a revised braking length as the difference between the current position and the target end position of braking (minus any safety margin), the target braking level calculator then recalculates the functional form of the target braking and begins issuing the target braking levels in accordance with the new function. This recalculation of the braking length and overall braking function may be repeated continually throughout the braking. This feedback will help to ensure that, if the braking system fails to provide the braking commanded, for example runway conditions change in a way to which it is unable to adapt, the aircraft will still be brought to the end of its braking at the desired exit. With this feedback and continual updating of the measured parameters, the system is a learning system that can adapt itself to variations in the conditions.

The braking controller is preferably implemented as a digital signal processor with the various calculation units being implemented as parts of its program.

As is explained below the commanded braking force 905 can be utilised in a number of ways.

In a first example (FIGS. 2 to 6) the advanced braking system described above is used to convert the braking force commanded by the braking controller into brake pressure commands for the individual wheel brakes. Such a possibility is shown in FIG. 2 by the inclusion of the controller 900 in the controller 20, with the controller 900 providing its commanded braking force 905 as the overall braking command 501 in FIG. 5. In this case the feedback in braking length BL provided by the controller 900 controls the force demanded of the brakes—if, for example, the braking length rises because there has been more braking than planned the system reacts to demand less braking. This feedback is however arranged to be slower than the feedback in force provided by the controller 20.

In a second example the commanded force is converted to a command for the brake pressure using a constant for the brake gain. This command for pressure can then be applied to a traditional braking system, for example, that of FIG. 1.

The invention claimed is:

1. An aircraft braking controller, for use on an aircraft comprising sensors for providing information relating to a wheel of the aircraft to the controller,
   the controller comprising:
   i) sensor inputs for receiving information relating to the wheel of the aircraft from the sensors,
   ii) an input for receiving a command for braking, and
   iii) a control output for controlling braking provided by a brake of the wheel,
   wherein the controller is configured to monitor and record data from the sensor inputs for the wheel of the aircraft, including:
   a) the reacted torque provided to the wheel by the brake,
   b) the frictional torque on the wheel provided by interaction of the wheel with the ground, and
   c) a level of actuation applied to the brake,
   wherein the controller is configured to convert the command for braking into a command for a level of actuation to be applied to the brake of the wheel on the basis of the monitored and recorded data, and wherein the controller is configured to determine, using data from the sensor inputs and a threshold value of frictional torque provided by the ground wheel interaction, whether the wheel is in a brake torque limited region or in a region of braking limited by the friction between the wheel and the ground, and to control the braking in accordance with the determination, wherein the controller is configured to make the said determination on the basis of the monitored and recorded data listed i) to iii) above the controller further comprising
   an input for receiving a total command for braking for the set of wheels, and
   a braking distributor for dividing the total command for braking amongst brakes of the wheels and configured to supply a respective braking command to each of the wheels for a level of actuation to be applied to the brake of each wheel.

2. An aircraft braking controller as claimed in claim 1 comprising, for each said wheel, a wheel braking controller comprising:
   i) an input for receiving the respective braking command for the wheel,
   ii) an output for providing the level of actuation for the brake of the wheel, and
   iii) one or more sensors providing a measure of the level of braking provided by the wheel,
   wherein the wheel braking controller is configured to feedback the measure of the level of braking provided by the wheel to control the output of the level of actuation of the wheel brake so that the braking provided by the wheel tends towards the input command for braking.

3. An aircraft braking controller as claimed in claim 2, wherein the braking command for a wheel is in terms of the frictional braking force, between the wheel and ground, to be provided by the wheel.

4. An aircraft braking controller as claimed in claim 2, wherein the braking command for a wheel is in terms of the frictional torque on the wheel to be provided by the brake.

5. An aircraft braking controller as claimed in claim 1 comprising sensors monitoring the performance of the brakes, wherein the braking distributor is configured not to supply a braking command for a wheel in excess of an indication of the braking available for the wheel based on the monitored performance.

6. An aircraft braking controller as claimed in claim 5 wherein the braking distributor is configured to divide the total command for braking amongst the brakes of the aircraft in accordance with whether the wheels are torque limited or ground friction limited.

7. An aircraft braking controller as claimed in claim 1 wherein the braking distributor is configured not to make a total braking force required of the set of wheels of a landing gear equal to that of a symmetrically placed landing gear.

8. An aircraft braking controller, for use on an aircraft comprising sensors for providing information relating to a wheel of the aircraft to the controller,
   the controller comprising:
   i) sensor inputs for receiving information relating to the wheel of the aircraft from the sensors,
   ii) an input for receiving a command for braking, and
   iii) a control output for controlling braking provided by a brake of the wheel,
   wherein the controller is configured to monitor and record data from the sensor inputs for the wheel of the aircraft, including:
   a) the reacted torque provided to the wheel by the brake,
   b) the frictional torque on the wheel provided by interaction of the wheel with the ground, and
   c) a level of actuation applied to the brake,
   wherein the controller is configured to convert the command for braking into a command for a level of actuation to be applied to the brake of the wheel on the basis of the monitored and recorded data, and wherein the controller is configured to determine, using data from the sensor inputs and a threshold value of frictional torque provided by the ground wheel interaction, whether the wheel is in a brake torque limited region or in a region of braking limited by the friction between the wheel and the ground, and to control the braking in accordance with the determination, wherein the controller is configured to make the said determination on the basis of the monitored and recorded data listed i) to iii) wherein the sensors include:

one or more sensors for providing a measure of the level of braking provided by the wheel, and wherein the controller is configured to feedback the measure of the level of braking provided by the wheel to control the output of the level of actuation of the wheel brake so that the braking provided tends towards the input command for braking.

9. An aircraft braking controller as claimed in claim 8 wherein the measure of the level of the braking provided as feedback is a gain value of the brake.

10. An aircraft braking controller as claimed in claim 9 wherein the brake gain value relates to the ratio of the level of actuation of the brake to the frictional torque provided by the brake.

11. An aircraft braking controller as claimed in claim 8 wherein the measure of the level of the braking provided as feedback is the frictional force provided by the wheel under braking.

12. An aircraft braking controller, for use on an aircraft comprising sensors for providing information relating to a wheel of the aircraft to the controller,
the controller comprising:
i) sensor inputs for receiving information relating to the wheel of the aircraft from the sensors,
ii) an input for receiving a command for braking, and
iii) a control output for controlling braking provided by a brake of the wheel,
wherein the controller is configured to monitor and record data from the sensor inputs for the wheel of the aircraft, including:
a) the reacted torque provided to the wheel by the brake,
b) the frictional torque on the wheel provided by interaction of the wheel with the ground, and
c) a level of actuation applied to the brake,
wherein the controller is configured to convert the command for braking into a command for a level of actuation to be applied to the brake of the wheel on the basis of the monitored and recorded data, and wherein the controller is configured to determine, using data from the sensor inputs and a threshold value of frictional torque provided by the ground wheel interaction, whether the wheel is in a brake torque limited region or in a region of braking limited by the friction between the wheel and the ground, and to control the braking in accordance with the determination, wherein the controller is configured to make the said determination on the basis of the monitored and recorded data listed i) to iii) above;
wherein the controller is configured to monitor and record the following data from sensor inputs for the wheel of the aircraft:
a braking force provided by the wheel,
a vertical load on the wheel, and
a slip ratio for the wheel,
and, wherein the braking controller is arranged to control the level of actuation to be applied to the brake of the wheel so as to prevent the wheel from entering an unstable region where the wheel skids.

13. An aircraft braking controller, for use on an aircraft comprising sensors for providing information relating to a wheel of the aircraft to the controller,
the controller comprising:
i) sensor inputs for receiving information relating to the wheel of the aircraft from the sensors,
ii) an input for receiving a command for braking, and
iii) a control output for controlling braking provided by a brake of the wheel,
wherein the controller is configured to monitor and record data from the sensor inputs for the wheel of the aircraft, including:
a) the reacted torque provided to the wheel by the brake,
b) the frictional torque on the wheel provided by interaction of the wheel with the ground, and
c) a level of actuation applied to the brake,
wherein the controller is configured to convert the command for braking into a command for a level of actuation to be applied to the brake of the wheel on the basis of the monitored and recorded data, and wherein the controller is configured to determine, using data from the sensor inputs and a threshold value of frictional torque provided by the ground wheel interaction, whether the wheel is in a brake torque limited region or in a region of braking limited by the friction between the wheel and the ground, and to control the braking in accordance with the determination, wherein the controller is configured to make the said determination on the basis of the monitored and recorded data listed i) to iii) above;
configured to determine a brake gain value from the monitored and recorded data and to convert the command for braking into the command for a level of actuation using the value.

14. An aircraft braking controller, for use on an aircraft comprising sensors for providing information relating to a wheel of the aircraft to the controller,
the controller comprising:
i) sensor inputs for receiving information relating to the wheel of the aircraft from the sensors,
ii) an input for receiving a command for braking, and
iii) a control output for controlling braking provided by a brake of the wheel,
wherein the controller is configured to monitor and record data from the sensor inputs for the wheel of the aircraft, including:
a) the reacted torque provided to the wheel by the brake,
b) the frictional torque on the wheel provided by interaction of the wheel with the ground, and
c) a level of actuation applied to the brake,
wherein the controller is configured to convert the command for braking into a command for a level of actuation to be applied to the brake of the wheel on the basis of the monitored and recorded data, and wherein the controller is configured to determine, using data from the sensor inputs and a threshold value of frictional torque provided by the ground wheel interaction, whether the wheel is in a brake torque limited region or in a region of braking limited by the friction between the wheel and the ground, and to control the braking in accordance with the determination, wherein the controller is configured to make the said determination on the basis of the monitored and recorded data listed i) to iii); and
wherein the level of actuation is brake pressure.

15. An aircraft braking controller, for use on an aircraft comprising sensors for providing information relating to a wheel of the aircraft to the controller,
the controller comprising:
i) sensor inputs for receiving information relating to the wheel of the aircraft from the sensors,
ii) an input for receiving a command for braking, and
iii) a control output for controlling braking provided by a brake of the wheel, wherein the controller is configured to monitor and record data from the sensor inputs for the wheel of the aircraft, including:
a) the reacted torque provided to the wheel by the brake,
b) the frictional torque on the wheel provided by interaction of the wheel with the ground, and
c) a level of actuation applied to the brake,
wherein the controller is configured to convert the command for braking into a command for a level of actuation to be applied to the brake of the wheel on the basis of the monitored and recorded data, and wherein the controller is configured to determine, using data from the sensor inputs and a threshold value of frictional torque provided by the ground wheel interaction, whether the wheel is in a brake torque limited region or in a region of braking limited by the friction between the wheel and the ground, and to control the braking in accordance with the determination, wherein the controller is configured to make the said determination on the basis of the monitored and recorded data listed i) to iii) above; and
wherein the controller is configured to divide a total command for braking amongst a plurality of brakes of the aircraft in accordance with whether respective wheels of the aircraft are torque limited or ground friction limited.

16. An aircraft braking controller, for use on an aircraft comprising sensors for providing information relating to a wheel of the aircraft to the controller,
the controller comprising:
i) sensor inputs for receiving information relating to the wheel of the aircraft from the sensors,
ii) an input for receiving a command for braking, and
iii) a control output for controlling braking provided by a brake of the wheel,
wherein the controller is configured to monitor and record data from the sensor inputs for the wheel of the aircraft, including:
a) the reacted torque provided to the wheel by the brake,
b) the frictional torque on the wheel provided by interaction of the wheel with the ground, and
c) a level of actuation applied to the brake,
wherein the controller is configured to convert the command for braking into a command for a level of actuation to be applied to the brake of the wheel on the basis of the monitored and recorded data, and wherein the controller is configured to determine, using data from the sensor inputs and a threshold value of frictional torque provided by the ground wheel interaction, whether the wheel is in a brake torque limited region or in a region of braking limited by the friction between the wheel and the ground, and to control the braking in accordance with the determination, wherein the controller is configured to make the said determination on the basis of the monitored and recorded data listed i) to iii) above; and
wherein the controller is configured to limit the level of actuation to be applied to the brake on the basis of a temperature of a brake or an estimate thereof so as to prevent overheating of the brake.

17. An aircraft braking controller, for use on an aircraft comprising sensors for providing information relating to a wheel of the aircraft to the controller,
the controller comprising:
i) sensor inputs for receiving information relating to the wheel of the aircraft from the sensors,
ii) an input for receiving a command for braking, and
iii) a control output for controlling braking provided by a brake of the wheel,
wherein the controller is configured to monitor and record data from the sensor inputs for the wheel of the aircraft, including:
a) the reacted torque provided to the wheel by the brake,
b) the frictional torque on the wheel provided by interaction of the wheel with the ground, and
c) a level of actuation applied to the brake,
wherein the controller is configured to convert the command for braking into a command for a level of actuation to be applied to the brake of the wheel on the basis of the monitored and recorded data, and wherein the controller is configured to determine, using data from the sensor inputs and a threshold value of frictional torque provided by the ground wheel interaction, whether the wheel is in a brake torque limited region or in a region of braking limited by the friction between the wheel and the ground, and to control the braking in accordance with the determination, wherein the controller is configured to make the said determination on the basis of the monitored and recorded data listed i) to iii) above; and
wherein the controller is configured to distribute a total braking force evenly among a plurality of wheels of a landing gear of the aircraft by controlling brake pressures of the wheels individually.

18. An aircraft braking controller, for use on an aircraft comprising sensors for providing information relating to a wheel of the aircraft to the controller, the controller comprising:
i) sensor inputs for receiving information relating to the wheel of the aircraft from the sensors,
ii) an input for receiving a command for braking, and
iii) a control output for controlling braking provided by a brake of the wheel,
wherein the controller is configured to monitor and record data from the sensor inputs for the wheel of the aircraft, including:
a) the reacted torque provided to the wheel by the brake,
b) the frictional torque on the wheel provided by interaction of the wheel with the ground, and
c) a level of actuation applied to the brake,
wherein the controller is configured to convert the command for braking into a command for a level of actuation to be applied to the brake of the wheel on the basis of the monitored and recorded data, and wherein the controller is configured to determine, using data from the sensor inputs and a threshold value of frictional torque provided by the ground wheel interaction, whether the wheel is in a brake torque limited region or in a region of braking limited by the friction between the wheel and the ground, and to control the braking in accordance with the determination, wherein the controller is configured to make the said determination on the basis of the monitored and recorded data listed i) to iii) above; and
wherein the controller is configured to distribute a total braking force between a plurality of landing gears of the aircraft symmetrically.

19. An aircraft braking controller, for use on an aircraft comprising sensors for providing information relating to a wheel of the aircraft to the controller,
the controller comprising:
i) sensor inputs for receiving information relating to the wheel of the aircraft from the sensors,
ii) an input for receiving a command for braking, and iii) a control output for controlling braking provided by a brake of the wheel, wherein the controller is configured to monitor and record data from the sensor inputs for the wheel of the aircraft, including:

a) the reacted torque provided to the wheel by the brake,
b) the frictional torque on the wheel provided by interaction of the wheel with the ground, and
c) a level of actuation applied to the brake, wherein the controller is configured to convert the command for braking into a command for a level of actuation to be applied to the brake of the wheel on the basis of the monitored and recorded data, and wherein the controller is configured to determine, using data from the sensor inputs and a threshold value of frictional torque provided by the ground wheel interaction, whether the wheel is in a brake torque limited region or in a region of braking limited by the friction between the wheel and the around, and to control the braking in accordance with the determination, wherein the controller is configured to make the said determination on the basis of the monitored and recorded data listed i) to iii) above; and wherein the controller is configured to distribute a total braking force among a plurality of wheels of a landing gear of the aircraft to make a net torque of the wheels on the landing gear equal zero.

20. An aircraft braking controller, for use on an aircraft comprising sensors for providing information relating to a wheel of the aircraft to the controller, the controller comprising:

i) sensor inputs for receiving information relating to the wheel of the aircraft from the sensors,
ii) an input for receiving a command for braking, and
iii) a control output for controlling braking provided by a brake of the wheel, wherein the controller is configured to monitor and record data from the sensor inputs for the wheel of the aircraft, including:

a) the reacted torque provided to the wheel by the brake,
b) the frictional torque on the wheel provided by interaction of the wheel with the ground, and
c) a level of actuation applied to the brake, wherein the controller is configured to convert the command for braking into a command for a level of actuation to be applied to the brake of the wheel on the basis of the monitored and recorded data, and wherein the controller is configured to determine, using data from the sensor inputs and a threshold value of frictional torque provided by the ground wheel interaction, whether the wheel is in a brake torque limited region or in a region of braking limited by the friction between the wheel and the ground, and to control the braking in accordance with the determination, wherein the controller is configured to make the said determination on the basis of the monitored and recorded data listed i) to iii) above; and the aircraft braking controller being installed on the aircraft and connected to the sensors on the aircraft configured to provide to the controller information from which the said data monitored and recorded can be derived.

* * * * *